UNITED STATES PATENT OFFICE.

JOSEPH ALBERT, OF MUNICH, BAVARIA.

IMPROVEMENT IN PRINTING PHOTOGRAPHS.

Specification forming part of Letters Patent No. 97,336, dated November 30, 1869; reissue No. 4,328, dated April 11, 1871.

I, JOSEPH ALBERT, of Munich, in the Kingdom of Bavaria, photographer, have invented an Improvement in Photography, consisting of a method of preparing photographic pictures upon plates of glass, for printing with fatty inks upon a press, which improvement I term "Albertypy," or "immutable printing by light," of which the following is a specification:

It has been known for some years that chrome-gelatine is sensitive to light, and that the parts acted upon by light will receive fatty ink, while the parts not acted upon by light, after being moistened, reject the ink. In this manner paper prepared with chrome-gelatine exposed to light and washed, then stippled or rolled with printing-ink, has been transferred to stone for printing, or the chrome-gelatine spread directly on the stone or copper, and then printed from. The result of these methods, however, has not been such as to supersede photography, and the pursuit of this object might have been abandoned or delayed for years but for the discovery which I have made, by which the long-sought problem is solved.

A process to accomplish this object must be certain and simple, and to attain these results it occured to me to use glass plates in such a manner that the process can be watched as it progresses, and stopped at the exact time of its completion. No material equals glass for this purpose, either for the certainty and beauty of the result it gives or for cheapness or clearness; but, excellent as it is, it would not be available in consequence of the gelatine film separating from it after a few impressions, except for my discovery of a method of cementing the film so firmly to the glass that a very large number of impressions of uniform beauty can be obtained. This is effected by the manner in which a film of gelatinous, albuminous, or any equivalent substance is affixed to the glass in so permanent a manner that it will act as a bond or cement to retain and permit of the hardening of a second film to be acted upon by light transmitted through a negative picture, and thereby made to become a medium for printing a photographic picture with fatty ink, by which method such durability is attained that I have succeeded in printing two thousand fine impressions from a single plate. It is the method by which this is accomplished which constitutes my invention, and for which I desire to secure Letters Patent.

My process consists as follows: A piece of plate glass is cleaned with alcohol, and, by preference, flowed with a mixture of albumen and gelatine, or either separately, and bichromate of ammonia, and left horizontal to dry; when dry it is laid with its coated side on a dark surface and exposed for a short time to the light from the side upon which there is no film. The chrome-gelatine becomes insoluble through the agency of light, and adheres so closely to the glass as to prevent the moisture to which the plate is afterward subjected from penetrating to the glass, and consequently the film will remain firmly attached thereto; and in order that the second film may adhere to the first it is necessary that the exposure to the light should be from the back or side which is not coated, and to protect the face with a dark underlayer which absorbs the penetrating rays as much as possible, so that it may retain its adhesive properties sufficiently to unite with and secure the second film on the surface of the first, and thus both become firmly united to the glass. After this exposure the plate is laid for a half hour in water, and then set aside to dry. These manipulations can be performed months in advance of using, if desired.

The cementing film constitutes the foundation of the sensitive preparation which is to receive the impression of the picture from the photographic negative, and it may be prepared without mixing the salts of chromic acid with the gelatine or albumen, and the film hardened or coagulated by means of acetic or chromic acid, or by alcohol, or by heating, (if albumen is employed,) with more or less success.

The second step of the process consists in again coating the plate thus prepared with the proper sensitive film, composed, preferably, of isinglass, gelatine, and chromate or bichromate of ammonium, and set aside to dry, as before. When dry the plate is ready to receive the picture, and is placed in the pressure-frame on a negative and exposed to the light in the same manner as is done with an albumen print, except that the action of the light is watched from the back through the transparent glass, and the plate removed at the proper moment. It is then washed in water to remove all unchanged chromates, and may then be treated with chrome-alum, chlorine-water, or any other coagulating material, in order to render the film more durable. When dry it is printed from in the usual lithographic manner upon a press adapted to that purpose.

An essential principle of my invention consists in hardening the film upon the surface of the glass so as to remain permanently affixed thereto, and yet its outer surface remain sufficiently adhesive to unite with the second film or sensitizing material; and, if these conditions are observed, both the first and second films will permit the use of other materials, such as glue, gum, dextrine, or almost any adhesive or gelatinous substance, as well as any of the salts of chromium, with more or less success.

Instead of glass any other transparent or semi-transparent medium may be used.

I claim as my invention—

1. Preparing photographic plates for printing with fatty inks by subjecting a film of chrome-gelatine, or other suitable material, spread upon glass or other transparent or semi-transparent substance, to the action of light, or otherwise hardening the film to render it insoluble upon the surface in contact therewith, and preserving the outer surface in a sufficiently-adhesive condition to unite with a second or sensitive film to receive the photographic image, substantially as herein set forth.

2. The employment of a fixing or cementing film to unite the sensitive film to the glass for printing in fatty inks, substantially as set forth.

3. The employment of glass plates for the printing of photographic pictures in fatty inks, substantially as herein set forth.

JOS. ALBERT.

Witnesses:
J. RICHTER,
W. BRUNO.